United States Patent [19]

Nowak

[11] 3,984,181

[45] Oct. 5, 1976

[54] RECORDING- OR REPRODUCING APPARATUS

[75] Inventor: Johann Nowak, Vienna, Austria

[73] Assignees: Karl Vockenhuber; Raimund Hauser, both of Vienna, Austria

[22] Filed: Mar. 17, 1975

[21] Appl. No.: 559,228

Related U.S. Application Data

[63] Continuation of Ser. No. 496,587, Aug. 12, 1974, which is a continuation of Ser. No. 339,029, March 7, 1973, abandoned.

[30] Foreign Application Priority Data

Mar. 8, 1972 Austria .............................. 1920/72

[52] U.S. Cl. ............................... 352/194; 352/180
[51] Int. Cl.² ........................................... G03B 1/22
[58] Field of Search ........... 352/180, 194, 195, 196; 226/62

[56] References Cited
UNITED STATES PATENTS

| | | | |
|---|---|---|---|
| 3,181,174 | 4/1965 | Griffioen ............................ | 352/180 |
| 3,402,007 | 9/1968 | Gerlach ............................. | 352/180 |
| 3,536,389 | 10/1970 | Reinsch ............................ | 352/180 |
| 3,580,668 | 5/1971 | Claar ................................. | 352/180 |

*Primary Examiner*—Monroe H. Hayes
*Attorney, Agent, or Firm*—Ernest G. Montague; Karl F. Ross; Herbert Dubno

[57] ABSTRACT

The invention relates to a recording- or reproducing apparatus for a strip-type information carrier having different operating modes and comprising an intermittent drive mechanism including a cam device rotatable about at least one axis. A carrier is movable relative to the cam device and has at least two positions corresponding to different operating modes; at least two cam followers are provided for engagement with the cam device. The cam followers are arranged in spaced relation on the carrier, each cam follower having an operative and at least one inoperative position in dependence on the position of the carrier. The respective cam follower transmits movement from the cam device for the intermittent drive of the information carrier only in its operative position. The apparatus further comprises a mode control device which is operatively connected to the carrier and controls the positions thereof.

11 Claims, 26 Drawing Figures

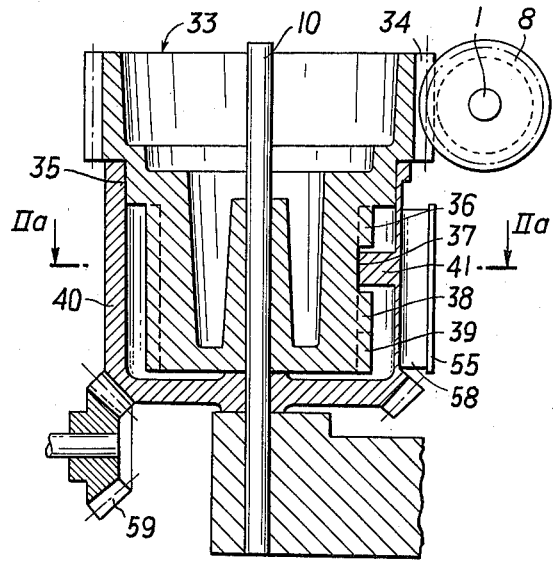
FIG. 2
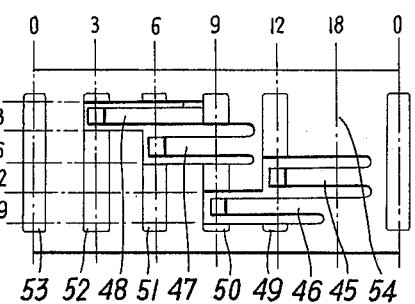
FIG. 2b
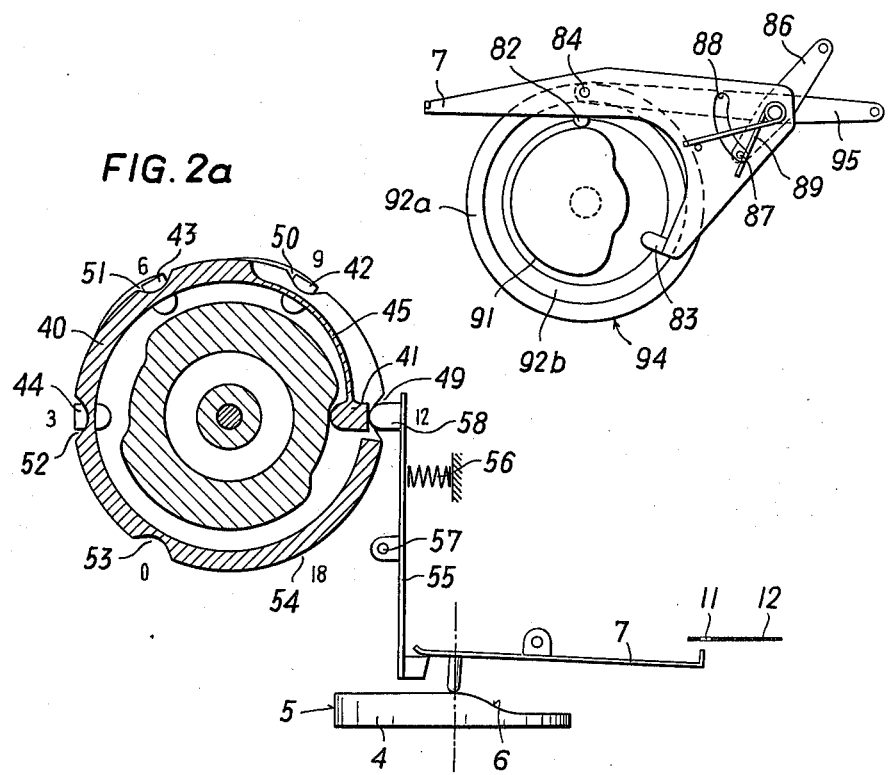
FIG. 2a
FIG. 10

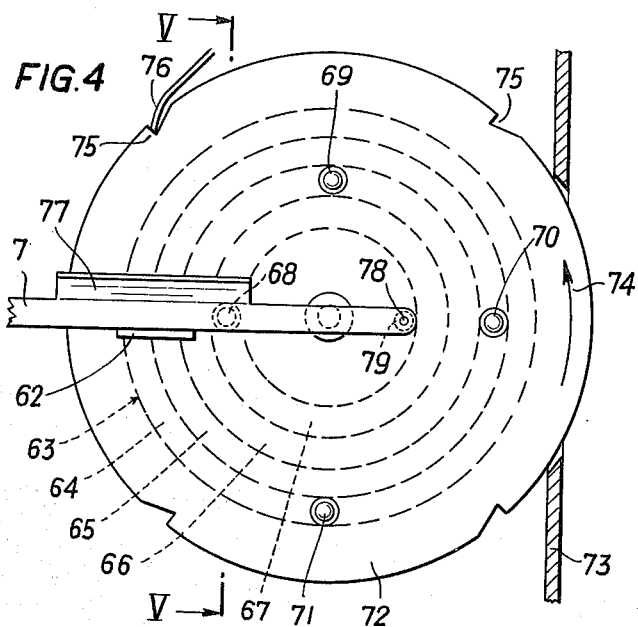
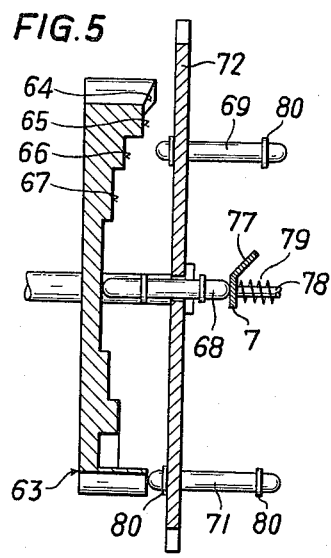
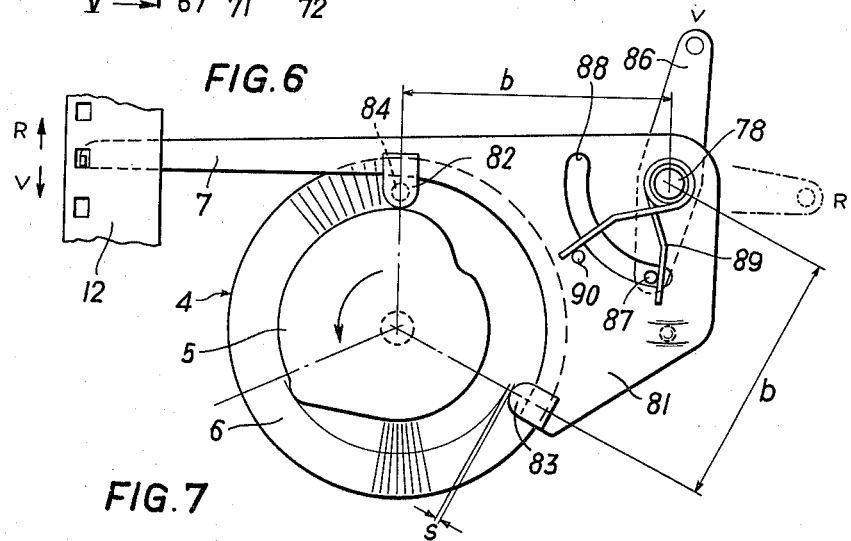
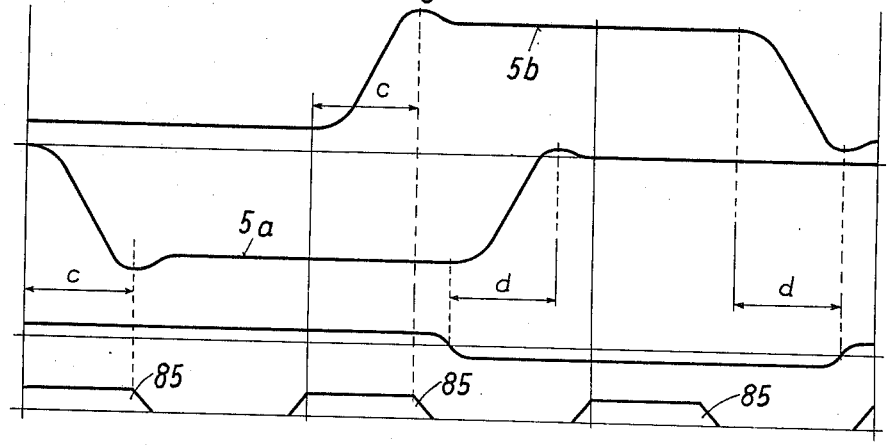

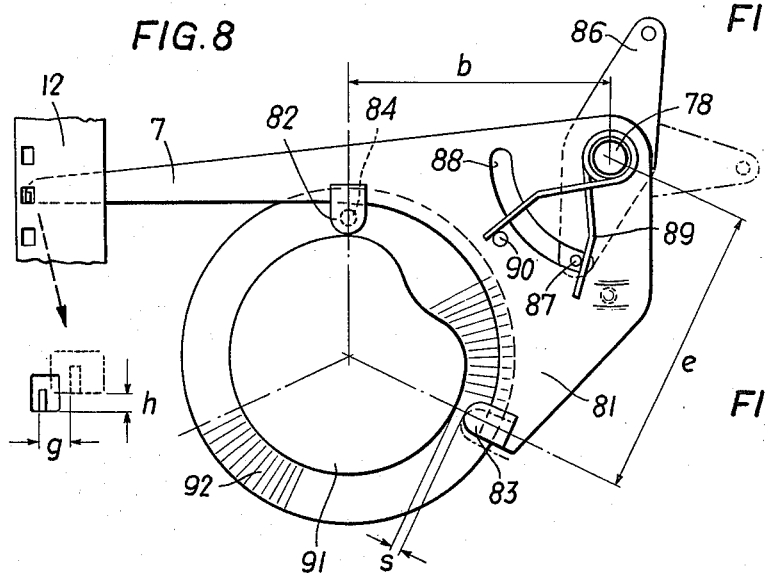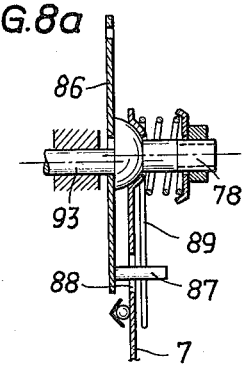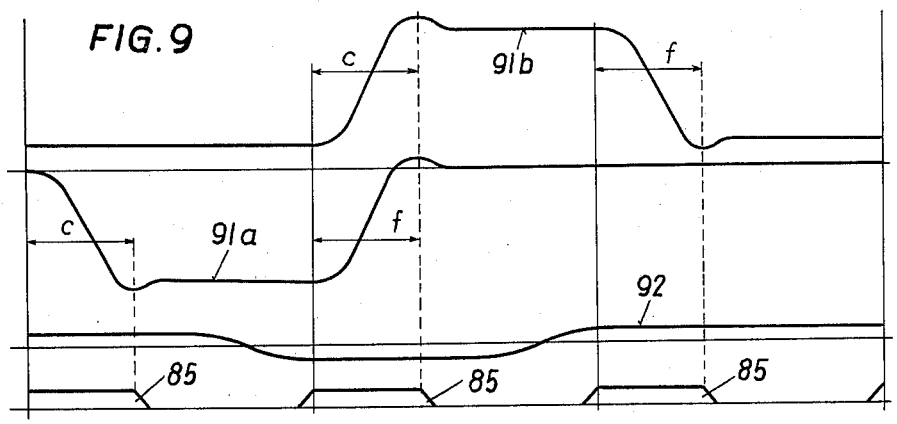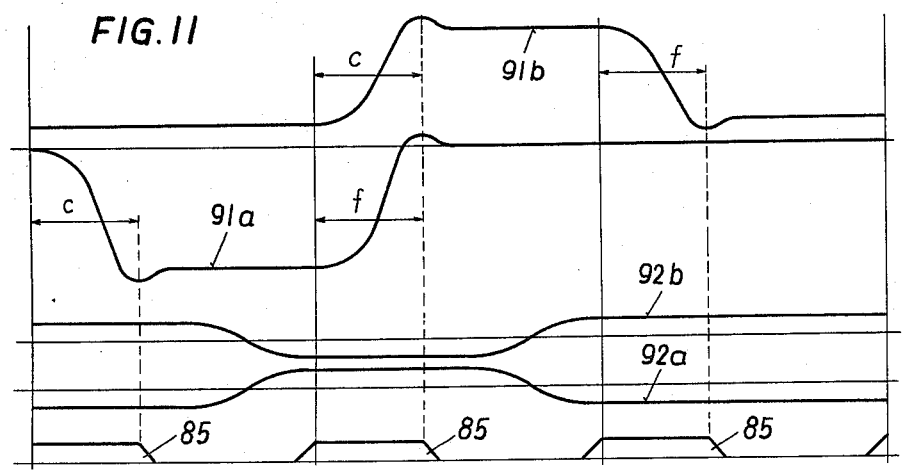

RECORDING- OR REPRODUCING APPARATUS

This is a continuation division of application Ser. No. 496,587 filed 12 Aug. 1974 as a continuation of application Ser. No. 339,029 filed 7 Mar. 1973, now abandoned.

FIELD OF THE INVENTION

The invention relates to a recording- or reproducing apparatus for a strip-type information carrier, in particular to a substandard-format film projector, having an intermittent drive for the strip and at least one cam rotatable about an axis, preferably a claw device, the cam being sensed by at least one cam follower arranged on a carrier, change-over means being provided for the adjustment of the carrier upon change-over of the apparatus to different modes of operation.

BACKGROUND OF THE INVENTION

An apparatus of this type has become known, for instance, from Austrian Patent Specification 292,454. The aim of the present invention is was to reduce the structural complexity and cost relative to the known arrangement, with an additional increase in the number of change-over positions. According to the invention this is achieved by the carrier having as is known per se, a plurality of cam followers spaced at a distance from each other, one of the latter being selectively switched from an operative position controlling the intermittent drive into an inoperative position by the change-over means. The intermittent drive may be a beater drive or a claw device. From German patent DAS 1 810 494 a carrier with a plurality of cam followers has become known; there, however the cam followers were not individually actuated by choice, but one or more were actuated according to the desired frame frequency. It is also known from German patent DOS 2,048,334 to provide a plurality of cams, each cam being driven at a different number of revolutions/second, one cam follower being assigned to each cam; these cam followers are, however arranged on different carriers, which bear upon a common drive member actuating a claw. This construction is, however, relatively complicated and expensive, and the application of a large number of different cams does not appear to be possible.

OBJECTS OF THE INVENTION

It is accordingly an object of this invention to avoid the aforesaid disadvantages.

SUMMARY OF THE INVENTION

In an apparatus, in which the carrier itself is not designed as a claw lever or a beater, but which is operatively connected with a transport device, a change-over from one mode of operation to an other may be considerably simplified if such a carrier bears a number of cam followers and if the cams are arranged on a common shaft spaced at an axial distance from each other, as is known per se. In order for a change-over to be only possible in certain positions of the cams, the carrier effecting the change-over is displaceable according to an advanced embodiment in a transverse direction to the generatrices of the cam surfaces.

According to another advanced embodiment of the invention in an arrangement using an apparatus fitted with a device having alternate light-interrupting and light-transmitting phases, for example by means of a stroboscopic operation of a projection lamp, the gear followers are phase-shifted with respect to the center axis of the cam by an angle corresponding to the formula $$360/f \cdot x$$

in which $f$ represents the frequency of the light-interrupting phase per operating cycle of the intermittent drive and $x$ an integral number; many different variations of this embodiment are possible.

BRIEF DESCRIPTION OF THE DRAWING

Further advantages and features of the present invention will become apparent from a discription of the following embodiments schematically illustrated in the drawings, in which;

FIGS. 2, 2a, 2b show another embodiment, FIG. 2a representing a section along line IIa-IIa of FIG. 2, and FIG. 2b the development of the cam revolver illustrated in FIGS. 2 and 2a;

FIG. 4 and 5 show another construction, FIG. 5 representing section along line V - V of FIG. 4.

FIGS. 6 and 7 illustrate yet another design, FIG. 7 showing a motion diagram of the embodiment according to FIG. 6.

FIGS. 8, 8a, 8b and 9 show another embodiment, FIGS. 8a and 8b showing details of FIG. 8, and FIG. 9 representing the corresponding motion diagram; FIGS. 10 and 11 illustrate the design and motion diagram respectively of still another embodiment.

SPECIFIC DESCRIPTION

Figure 1:
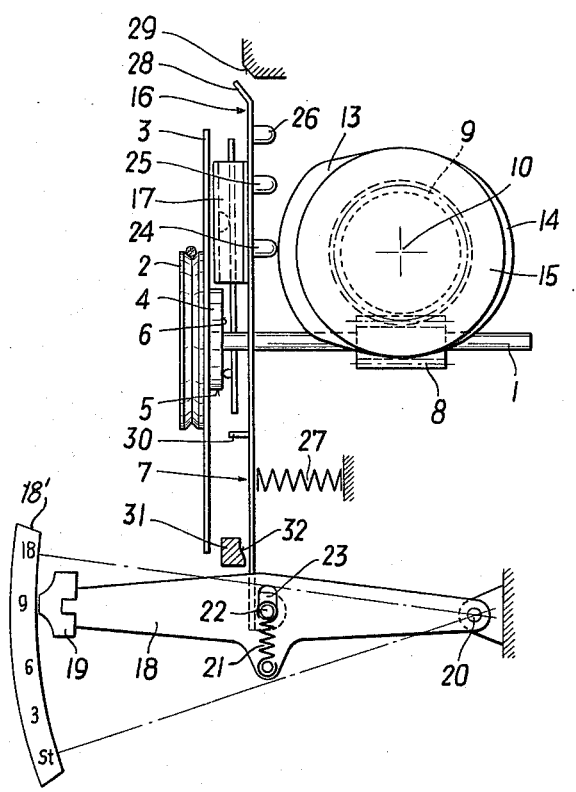
FIG. 1 and FIG. 1a show a first embodiment in elevation and top view respectively.

According to FIG. 1 there is provided a main shaft 1 in a cinematographic apparatus, not shown in detail, for example a substandard format film projector. This main shaft 1 is driven by means of a belt pulley 2. Further a shutter 3 and a claw cam 4 are connected to main shaft 1. Claw cam 4 shows a transport-cam surface 5 and an engaging-cam surface 6 on its front side. As known per se, the two surfaces cooperate with a schematically illustrated claw 7, the detailed construction of which is not the subject matter of the invention.

A worm 8 is provided on main shaft 1. Worm 8 drives a cam shaft indicated in a dash-dot line 10 (Fig. 1a) by means of a worm wheel 9. On this cam shaft there are provided three cams 13, 14, 15 extending in an axial direction, which prevent an engaging lift of claw 7 into perforation holes 11 of the film 12. By choice anyone, or none of cams 13, 14, 15, may be sensed, a carrier 16 bearing upon claw 7 by means of an operating extension 17, and removing it from the engaging cam surface 6, thus preventing an engagement of claw 7 into perforation holes 11. Cams 13, 14, 15 are so designed that they lift frames/second and the operation of cam 15 results in from engaging cam-surface 6. The arrangement is, for example, so designed that cam 13 removes claw 7 upon every second revolution of the main shaft 1, the cam 14 removes it twice per three revolutions of mainn shaft 1 and cam 15 six times per three revolutions of main shaft. If now main shaft 1 rotates at 18 revolutions per sec. which may be the case in a cinematographic camera, the operation of cam 13 results in a frame frequency of 9, frames/second, the operation of cam 14 results in a frame frequency of 6 frames/second and the operation of cam 15 results in a frame frequency of 3 frames per sec. Cams of this type are known per se.

For a change of the frame frequency there is provided a change-over lever 18. As illustrated in Fig. 1, change-over lever 18 bears an operating key 19, which is displaceable with respect to an indicating scale 18 disposed on the apparatus, showing the frame frequencies of the apparatus. To change-over lever 18, which is pivoted about an axis 20, there is fastened one end of a spring 21, the other end of which engages a pin 22 on carrier 16. Pin 22 is slidable in a slot 23 of change-over lever 18.

Carrier 16 bears three cam followers 24, 25 and 26, each of which is assigned to one of cams 13, 14 and 15 (FIG. 1a) and which are distributed over the length of the carrier 16 (Fig. 1). A spring 27 urges carrier 16 in the direction of cams 13, 14 and 15, permitting cam followers 24, 25 and 26 to sense these cams.

Further there is provided an oblique surface 28 on the upper end of carrier 16 (Fig. 1). This oblique surface 28 is able to cooperate with a likewise oblique stationary stop 29. If, for example change-over lever 18 is in its topmost position, which corresponds to a frame frequency of 18 frames per sec., stop 29 presses against the oblique surface 28 of carrier 16 and prevents on one hand cam followers 24, 25 and 26 from making contact with cams 13, 14 and 15, and on the other hand places extension 17 of the carrier 16 beyond the reach of claw 7. Thus none of cams 13, 14, 15 become effective.

Figure 1A:
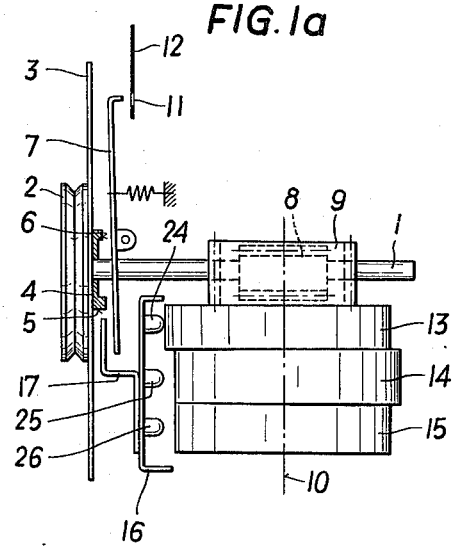

If, however, change-over lever 18 is removed to a position corresponding to a frame frequency of 9 frames per sec. on the indicating scale, cam follower 24 abuts cam 13. Thus cam 13 bears upon the claw 7 and the frame frequency is correspondingly reduced. This situation is illustrated in Figs. 1 and 1a.

Similar results are obtained, when change-over lever 118 is moved to positions corresponding to a frame frequency of 6 or 3 frames per sec., in which case cam followers 25 or 26 sense cams 14 or 15 respectively.

A further displacement of change-over lever 18 in a counterclockwise sense (related to Fig. 1) causes the path of a stop 30 arranged on carrier 16 to be within reach of a fixed counterstop 31. This occurs, when at a frame frequency of 3 frames per sec. cam follower 26 is within the range of a protrusion of cam 15 opposite therefrom, so that carrier 16 is pressed to the left (related to FIGS. 1 and 1a). Extension 17 (Fig. 1a) is then removed from the claw 7 so that the latter engages a perforation 11. If in this position claw 7 were to be commanded to stop, this would mean that the latter would be suddenly lifted and film 12 would possibly only be transported by half a frame. Therefore stops 30 and 31 are provided to avoid this problem. As soon as a recess of cam 15 is opposite cam follower 26, stop 30 is able to pass counterstop 31, cam follower 26 thereby also passing cam 15. Finally an oblique surface 32 on counterstop 31 causes stop 30 passing-by and hence carrier 16 to be displaced to the right, extension 17 thereby removing claw 7 from engaging cam surface 6 (related to FIGS. 1, 1a).

It may be mentioned that the change-over means described with carrier 16 bearing a number of cam followers may also be advantageously applied to other purposes. If, for example, cams 13, and/or 14, and/or 15 actuate claw 7 directly as engaging cams or transport cams, such an arrangement may be designed so that each of the cams is adapted for another film format or for a forward-or reverse run of film 12.

In the FIGS. 2, 2a and 2b there is illustrated an especially advantageous and space-saving variation of the embodiment of FIG. 1. Here parts performing the same function bear the same reference numerals. In contrast to the arrangement shown in FIGS. 1 and 1a however on axis or shaft 10 there is now provided a member 33 consisting for instance of synthetic plastic material, which shows a toothed gear 34 on an end cooperating with worm 8 a cam-follower carrier 40 of reduced diameter being disposed behind member 33, the reduction of the diameter of member 33 occurring in a stepwise fashion as shown by a step 35. Adjacent to this step 35 there are provided four cams 36, 37, 38 and 39, three cams of which correspond to cams 13, 14 and 15 of the Figs. 1 and 1a.

Cam-follower carrier 40 designed as a sort of turret is rotatable about axis 10 and abuts against step 35. Carrier 40 may for example consist of plastic material and have cam followers 41, 42, 43 and 44 arranged on tongues 45, 46, 47 and 48, which are cut out of the carrier material. Parallel to axis 10 there are provided slots 49, 50, 51 and 52 on carrier 40 within the range of the cam followers 41 to 44. Further there is arranged a slot 53 spaced at angular equidistance from the other slots, opposite of which there is no cam follower. No slots occur between slots 49 and 53, the surface of carrier 40 being continuous in a region 54.

A sensing lever 55 cooperates with cam-follower carrier 40, sensing lever 55, being biased by a spring 56 and pivotable about an axis 57. At least at its end facing the cam follower carrier, the lever 55 has a width, corresponding to the length of the slots 59 to 53. a sensing end 58 of lever 55 penetrates these slots and presses cam followers 41 to 44 arranged within the range of a slot to their respective assigned cams 36 to 39. In that way cam followers 41 to 44 assume their respective operating positions, in which they control the removal of claw 7 from engaging cam 6 by means of lever 55. If however carrier 40 is rotated around axis 10, a cam follower having previously occupied its operative position, reaches its rest position by means of the spring action of one of tongues 45 to 48, by means of which it is removed from its respective assigned cam. But even, when the tongues 45 to 48 show no spring action cam followers 41 to 44 being in control with a respective cam, no control action of lever 55 and therewith of the claw 7 can take place when a cam follower occupies a rest position due to the twist imparted to carrier 40.

While cams 36 to 39 are designed to obtain frame frequencies of 12, 9, 6 or 3 frames per sec., there results a continuous engagement of the lever end of lever 55 facing claw plate 7, when sensing extension 58 drops into slot 53, claw plate 7 thereby remaining continuously out of mesh with perforation 11. If, however the sensing extension 58 comes in contact with the continuous region 58 of carrier 40, lever 55 is continuously left outside of the moving path of claw 7. As may be seen in Fig. 2, there is provided a conical wheel 59 for rotation carrier 40, the former being rotatable by an operating handle from outside or by means of an automatic control device.

Figure 3:
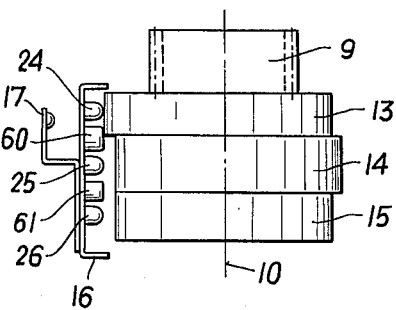
FIG. 3 shows in an illustration similar to FIG. 1a a detail of another embodiment.

Fig. 3 shows that it is not necessary within the scope of the invention that each cam be assigned only a single cam follower. Just for the control of different frame frequencies it may be expedient for the purpose of economizing cams, to combine the movement deriving simultaneously from two cams. A similar suggestion has already become known from the German DAS 1,597,176, though the construction shown therein is rather complicated. In the inventive design it suffices to provide an additional broader cam follower 60 between and a cam follower 61 between cam followers 25 and 26. Respective cam followers 60 and 61 sense simultaneously the cam shape of cams 13 and 14 on the one hand and 14 and 15 on the other hand so that a combination of two cams at a time is thereby obtained. Of course cam followers 60 and 61 must be disposed not only between respective cam followers 24, 25 and 26 on carrier 16, as illustrated in plan view in Fig. 3, but also between cam followers 24 and 26. Change-over lever 18 then has two additional change-over positions, which correspond to the operative position of respective cam followers 60 and 61.

In similar manner, as described in FIGS. 2, 2a and 2b in connection with radial cams 36 to 39, a cam follower turret for axial cams may alternately be FIGS. Figs. 4 and 5 display such an embodiment. In these figures a claw 7 is on one hand operated by a transport cam, not shown, which cooperates with a cam follower 62 arranged on claw 7. On the other hand the engaging lift is alternately controlled by four cam paths 64, 65, 66 and 67 provided on a cam member 63. For each of these cam paths 64 to 67 there are provided respective cam followers 68 to 71. These cam followers are supported by a turret disk 72 and are spaced in the illustrated embodiment not only by an angular distance of 90° from each other, but are also situated onn a different radius. In that way cam follower 68 cooperates with the innermost radial cam path 67, cam follower 71 with the outermost cam path 64 and cam followers 69 and 70 with two respective engaging cams lying between them. According to the position of the turret disk 72, however only a single cam follower at a time can reach an operative position, in which it controls the claw lever 7. Therefore claw lever 7 extends radially in relation to the cam member 63.

In order to change-over from one mode of operation to another, it is only required to rotate the turret disk 72. This may be carried out by a gear wheel as shown in Fig. 2, but in the illustrated embodiment turret disk 72 is designed as knurled disk, a segment of which extends into a casing wall 73 by means of a slot. Thus the turret disk 72 can be operated from outside, and rotated in the sense of an arrow 74 shown in Fig. 4. In order to avoid rotation in a clockwise sense and moreover to positively lock each operating position of turret disk 72, there are provided on its circumference sawtooth shaped latching-slots 75, a correspondingly formed stationary spring 76 cooperates with respective latching slots. Upon revolution of the turret disk 72 the cam follower, which has just left an operative position, for example cam follower 68, is removed from the range of the claw lever 7, whereas the respective next following cam follower abutting behind the claw lever 7. In order for this arrangement to work smoothly, claw lever 7 shows on its top side an oblique butting face 77. In the event such butting faces are provided on both sides of claw lever 7, revolving disk 72 could be operated in both directions of rotation. The restriction to one direction of rotation only however has certain advantages, particularly because the transport cam situated under cam lever follower 62 of claw 7 prevents the latter from moving counterclockwise with respect to its axis of rotation 78 in Fig. 4. While respective protruding spots in the cam paths of cam member 63 press the cam followers of the turret disk 72 in an outward direction (Fig. 5), where they remain in an inoperative position, respective cam followers in operative positions are pressed onto corresponding cam paths by means of a spring 79 looped around the axis 78 of claw 7; collars 80 on the cam followers of revolver disk 72 prevent them from falling out of the disk. were arranged on a carrier, which was only mechanically coupled to the transport device itself. However it is also possible to provide far instance on claw lever 7 a plurality of alternately operating cam followers. Such an embodiment is set forth in FIGS. 6 and 7. Here the carrier is formed by claw lever 7, which is rotatable about an axis 78. Claw lever 7 bears an angularly formed arm 81, a cam follower 82 being provided on claw lever 7 itself and a further cam follower 83 on an arm 81. These two cam followers 82, 83 can be abutted alternately against transport cam 5. A cam follower 84 shown in broken lines cooperates with engaging cam 6. The distance $b$ from the center of the cam follower 82 equals the distance from cam follower 83 to the center of axis 78 (Fig. 6). The two cam followers 82, 83 are phase-shifted with respect to the center of the cam member 4 by 120°; it may be assumed that three light-interrupting phases are produced per revolution of cam member 4 in substandard-format film projector using the arrangement as illustrated in Fig. 6. These light-interrupting phases may result from a stroboscopic-like operation of the projection lamp; generally, however, a shutter is used therefor. The motion diagram of Fig. 7 shows these light-interrupting phases 85.

A change-over lever 86 is rotatable about an axis 78, showing a pin 87 on one of its ends. This pin 87 penetrates a slot 88 in claw lever 7 bent around axis 78 and acts on a tension spring 89. Claw lever 7 is provided with a stop 90 withon the range of slot 88 which abuts against one of the arms of spring 89, the other arm of spring 82 abutting against pin 87. By shifting change-over lever 86 the arms of spring 89 abutting against pins 87 and 90 and reversed, and so the direction of spring 89 acting on claw 7 is also reversed. That way either cam follower 82 or the cam follower 83 can abut alternately against transport cam 5.

If now curve 5a changes (FIG. 7), so that claw 7 follower abuts transport cam 5, cam follower 83 moves the claw to its operative position according to the curve 5b. As may be seen, curves 5a and 5b are not only phaseshifted relatively to each other by 120°, but curve 5b also exhibits a mirror symmetry with respect to curve 5a. This symmetry is due to the fact that cam follower 83 is seated on arm 81, so that each recess in cam 5 causes an upward movement of the claw 7. Accordingly a curve section c which corresponds to about one period of light-interrupting phase 85 and corresponds in curve 5a to the transport movement of the film 12 in the forward direction, acts in curve 5a in the opposite sense, causing reverse lift of the claw and therefore a reverse run of film 12. In FIG. 7 it may be seen that section c in curve 5b again coincides with a light-interrupting phase 85.

In order for claw 7 to cooperate with film 12 in both positions of section c, engaging cam 6 must be shaped so as to conform to the shape of a curve as displayed in FIG. 7. That means that the engaging lift must occur during 180° of the revolution of the cam member 4. However, in order for claw 7 not to execute any movement outside curve section c during these 180°, the ranges of transport cam 5 beyond section c are substantially straight lines to the extent that they fall within 180° of the engaging lift, related to Fig. 7. The idle lift of the claw in the section d is therefore relatively quick. That way a reversal of the transport direction of film 12 may be attained. As is known there results thereof a frame difference and this is compensated for by cam follower 8a showing in its inoperative position a distance s from the curve section of cam 5 having the largest radius. Upon changeover from its inoperative position to its operative position cam follower 83 must therefore cover distance a, claw 7 performing the movement necessary for that framing correction.

With only a slightly modified construction compared to FIG. 6, a change-over to different film formats instead of the forward or reverse motion of the film may be attained, and this is illustrated in FIG. 8. A basic condition here requires for instance cam follower 82 to be again located at a distance b from axis 78; however cam follower 83 will now be spaced at another distance e, from axis 78, the ratio of the distances b : e corresponding at least approximately, to the lift ratio of the claw 7 for different formats. It then becomes necessary to provide on cam member 4 additional cams 91 and 92 of a shape different from that of cams 5 and 6. The shape of these two cam-curves is shown in FIG. 9, where analogously to FIG. 7 the shape of curve 91a corresponds to the movement derived from cam follower 82, and the shape of curve 91b to the movement derived from cam follower 83. The engaging lift of engaging cam 92 is so chosen as to occur first during the first light-interrupting phase 85, but afterwards only again in the angular range after a revolution of cam member 4 of 240°. The symmetrical section c of curve 91b corresponding to the transport movement of curve 91a does not come into action with claw 7, but the return lift f of the curve 91a, which is symmetrical to the curve 91b as forward lift does. Here again distance s provides at least a partial framing correction.

As is known there often results a change of the perforation-hole centers upon change-over to a different film format. In Fig. 8 there are shown, in addition to the perforation holes of film 12, also perforation holes of another film format in broken lines. It may be observed that the perforation-hole centers differ by a distance g. Moreover it may be difficult to compensate for too large frame corrections only by adjustment of the distance s; a remaining framing distance h would still have to be corrected. To remedy this problem, axis 78 may be arranged in an advantageous embodiment excentrically on a stationary axis 93 as, for example, shown in FIG. 8b. Change-over lever 86 is rotatable about this axis 93. Here the arrangement is so designed, that upon displacement of the change-over lever 86 axis 78 performs a movement having two motion components.

One component extends in horizontal direction (related to FIG. 8b) and corresponds to the distance g between perforation-hole centers; the other vertical-motion component corresponds to the ratio of the lever length of the claw 7 to the additionally necessary framing correction given by the distance h. In that way two different corrections are carried out easily by a single movement of the axis 78.

It is certainly known to displace the claw axis for change-over from one film format to the other; in the embodiment described however, this function differs somewhat from that of prior art. As a matter of fact the proper lift change and the main correction on the claw is already effected by the changeover of cam follower 82 or 83. The displacement of axis 78 can therefore be kept very small, so that such problems are avoided. This displacement may be dropped, if the perforation-hole centers of the different formats are at least approximately equal, or if the framing correction can be properly effected by maintaining the distance s between cam 91 and the cam followers 82 or 83 respectively.

There remains the question of how a change-over from forward to reverse motion is possible for different film formats with a design of a claw device according to FIG. 6 or FIG. 8. The latter will now be discussed; e.g. FIG. 10 shows a design of a claw device corresponding to the claw device of FIG. 8. Accordingly the changeover from one format to the other is achieved by changeover lever 86 and by a change from cam follower 82 to cam follower 83 or vice-versa. Beyond that however, illustrated cam member 94 shows in addition to transport cam 91 two different engaging cams 92a and 92b. As displayed in FIG. 11, the displacement curves of these two engaging cams 92a and 92b are symmetrical, the engagement of claw 7 occuring optionally in section c or s of transport cam 91. The engagement in section f of curve 91a shows for example the back lift for super 8 mm film (Fir. 11). the engagement in the section fo of the curce 91b for example, the forward transport movement for normal 8 mm film. The same applies to section c in reversed sense.

For changing-over from forward to reverse motion there is then provided an additional change-over lever 95, which bears cam follower 84 displacing it according to the desired transport direction of film 12 from one to the other of the curves 92a and 92b.

Figure 12:
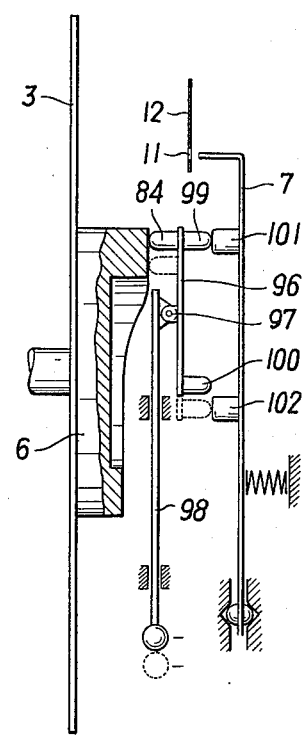
FIGS. 12 to 14 show schematically three additional embodiments, FIG. 15 being the motion diagram corresponding to FIG. 14.

FIG. 12 shows the cross-section of another embodiment of the invention, only a single engaging cam 6 being provided. To simplify the illustration, the transport cam has not been shown. With cam 6 there cooperates a cam follower 84 arranged on a two-armed lever 96. This lever 96 is pivoted about a bearing point 97, which is fastened to a change-over slider 98. On both ends of lever 96 there are further provided transmission rams 99 and 100. Depending on the position of change-over slider 98 either transmission ram 99 bears on a counter ram 101 of claw 7 or transmission ram 100 on a further counter ram 102 of claw 7. It is obvious that the two counter rams 101 and 102 are spaced a larger distance from each other than the two transmission rams 99 and 100. Thus depending on the position of the change-over slider 98 the shape of cam 6 is transmitted either directly to cam follower 84 and by transmission ram 99 to counter ram 101 or indirectly by reversal of movement by transmission ram 100 to counter ram 102. In order to permit the displacement of the cam follower 84 by means of the change-over slider 98, cam path of cam 6 must, of course, be broad enough.

Within the scope of the invention a great number of other embodiments are also possible in order to attain the reversal of the symmetrical movement of claw lift 7 according to the curves 92a, 92b, respectively, as illustrated in FIG. 11. Coaxially displaceable engaging cams may for example be provided as is already known Austrian Patent Specification 273,678.

Figure 13:
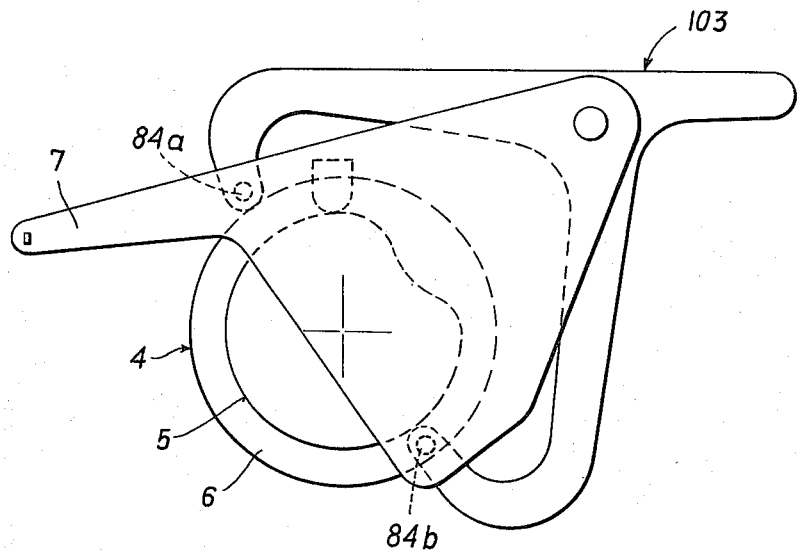

The invention is also in no way limited by the use of a carrier bearing a plurality of cam followers for the lifting of cams according to the FIGS. 1 to 5 or of transport cams according to the FIGS. 6 to 12. FIG. 13 also illustrates that for changing the transport direction of the film also a carrier 103 can be provided, which bears on each of two arms 84a and 84b of a cam follower and which alternately cooperate with engaging cam 6 or are in rest position. Since two cam followers 84a and 84b are spaced from each other of by 180° with respect to the center of cam member 4, the phase shifting between the transport movement and the engaging lift is correspondingly changed, as known per se, so that the engagement of claw 7 occurs at the return lift instead of at the forward lift.

Figure 14:
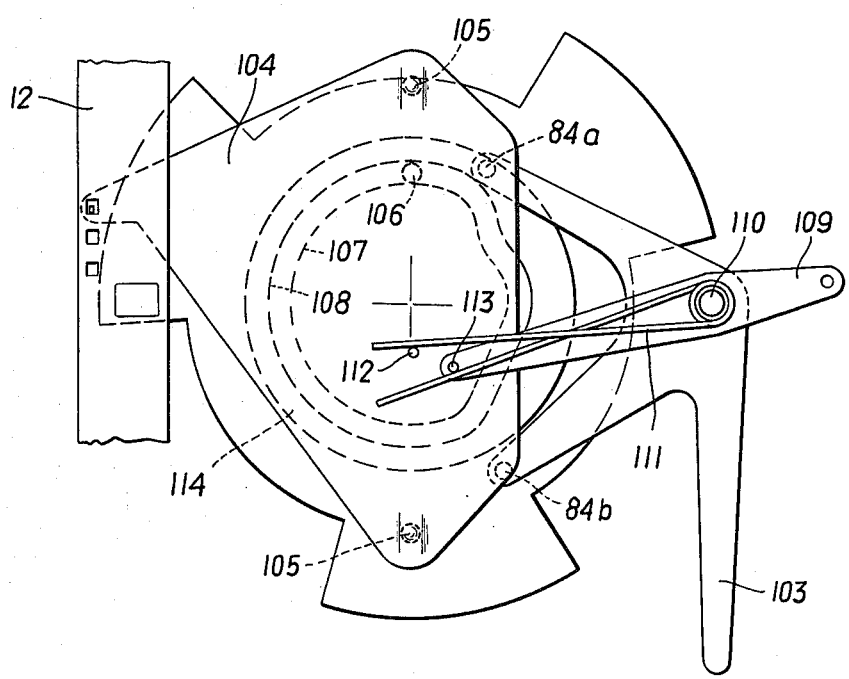

In order to adjust a claw device with respect to the transport direction, as well as with respect to the transport lift, there may be provided construction according to FIG. 14. Contrary to the embodiments set forth up to now, a claw plate 104 is here guided and displaceable in a translatory movement by means of balls 105, and on the other hand it is rotatable about an axis passing balls 105. To claw plate 104 there is connected a cam follower 106, which optionally cooperates with one of transport cams 107 and 108 spaced at a radial distance from each other. For a change-over to different film formats from cam follower 106 to cam 107 or to cam 108 or vice-versa there is provided a change-over lever 109. This lever 109 is rotatable about an axis 110 on which is also arranged a torsion spring 111 abut against two pins, cone of which i.e. pin 112 is fastened to claw plate 104, the other pin 113 being seated at the end of change-over lever 109. Depending on the position of change-over lever 109 either one or the other arm of spring 111 abuts against pin 112, the action of spring 111 being reversed accordingly. This cam follower 106 abuts one of two cams 107 and 108 respectively.

Figure 15:
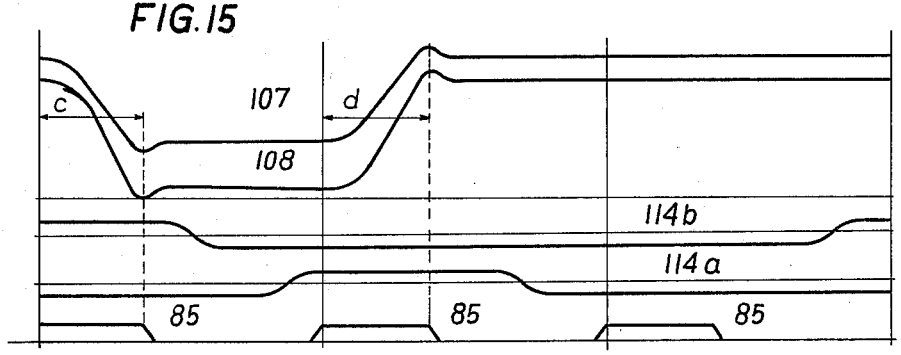

The shape of the respective cam paths can be seen from FIG. 15. Each of these cam paths shows again a section c, which corresponds to the forward transport movement of film 12, whereas section d corresponds to the reverse transport movement of the film 12. Each sections c and d again respectively corresponds to a light interrupting phase 85.

In order now to change-over from a forward motion of film 12 to a reverse motion, it is necessary to assign the engaging lift of claw 7 to section d instead of section c. That means that the phase position of the engaging lift must be shifted by 120°. The moving curves 114a and 114b of the engaging lift assigned to the sections c and d respectively are plotted in FIG. 15. These moving curves 114a, 114b derive from a single engaging cam 114, (FIG. 14), which is selectively followed by one of cam followers 84a and 84b. In this respect that construction is similar to the embodiment according to FIG. 13, the same reference numerals having been used; the two cam followers 84a and 84b are correspondingly controlled by a change-over lever 103. In contrast to FIG. 13, however, the angular distance between these cam followers 84a and 84b is 120° with respect to the center of the cams.

Figure 16:
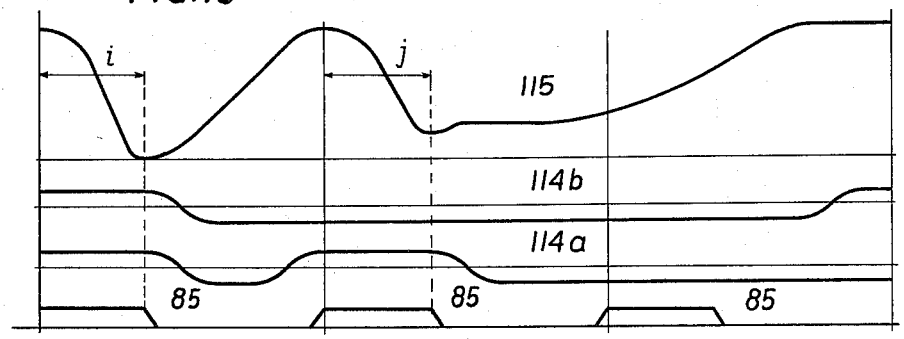
FIGS. 16 and 17 show motion diagrams of further embodiments.

According to FIG. 16, again the two engaging curves 114a and 114b are obtained with the same construction of engaging cam 114 and a corresponding change of the phase position of the engaging lift, either by using a change-over lever 103, or by twisting the engaging cam 114 with respect to the respective transport cam, or finally by providing two engaging cams displaced from each other by a fixed phase angle. In this embodiment, however, only a single transport cam having a path corresponding to curve 115 is so designed that a selective change-over to a raviably large transport movement of claw 7 is possible. As may be seen, this transport cam 115 shows a section i, including the transport movement for one film format, whereas a section j corresponds to thr transport movement of another film format. Of course an additional transport movement for yet another film format could be provided and care must only be taken that a transport movement corresponding to a respective curve section coincides with a light-interrupting phase. Should more than three transport movements be used, a four-bladed shutter should be provided on two transport movements could be assigned to a single light-interrupting phase, especially inn cinematographic cameras. The engaging lifts of the curves 114a, 114b are selectively assigned to one of sections I and j, respectively so that by merely changing the phase position of the engaging lift, a change-over from the transport movement of one format to the transport movement of the other format is possible.

Figure 17:
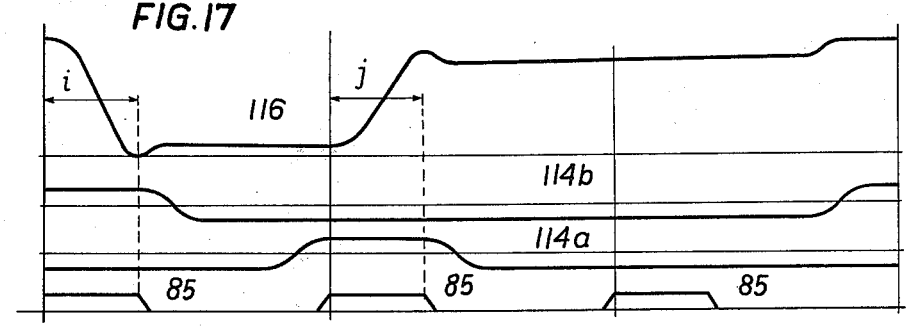
Figure 18:
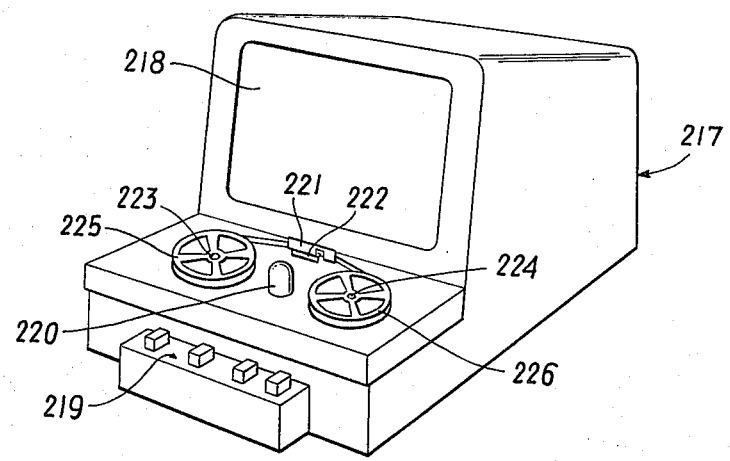
FIG. 18 is a perspective drawing of a projector illustrating the function of the embodiment according to FIG. 17.

A further embodiment is illustrated in FIGS. 17 and 18. It is assumed again that a phase shift of the engaging lift according to curves 114a and 114b is possible. On the other hand the transport cam shows a path for curve 116, providing transport movement for one format within section i, and the transport movement for the other format within section j. In this case however the transport movement of the section j is opposed to that of section i and consequently represents a reverse transport movement.

In FIG. 18 there is displayed a substandard format film projector 217, which for example may show incorporating a screen 218. This substandard format film projector 217 consists of a keyboard 219, a projection lamp 22o, a film gate 221 and a schematically indicated claw drive 222, Further there are provided two reel pins 223 and 224 adapted to receive reels 225 and 226. One of these reels is the supply reel, the other one the takeup reel.

If, for example, the section i of the transport curve 116 (FIG. 17) provides for the transport movement for super 8 mm films, and section for j the transport movement for conventional 8 mm films, it is only necessary to put the supply reel containing the super 8 mm film for instance on reel pin 223, whereupon the super 8 mm film is transported from reel 225 to the reel 226. On the other hand supply reels containing conventional 8 mm films are applied to reel pin 224, whereupon the film is transported from reel pin 226 to reel pin 225. Depending on the film format the transport direction is reversed. Arrangements may also be provided on the projector, which state the position of the perforation holes in a known manner comparing them to the adjustment of the engaging lift according to respective curves 114a and 114b. Upon a wrong adjustment of the engaging lift the operation of projector 21y is interrupted. Arrangements for stating the position of the perforation holes of a film have become known from Austrian Patent Specification 294,577.

Figure 19:
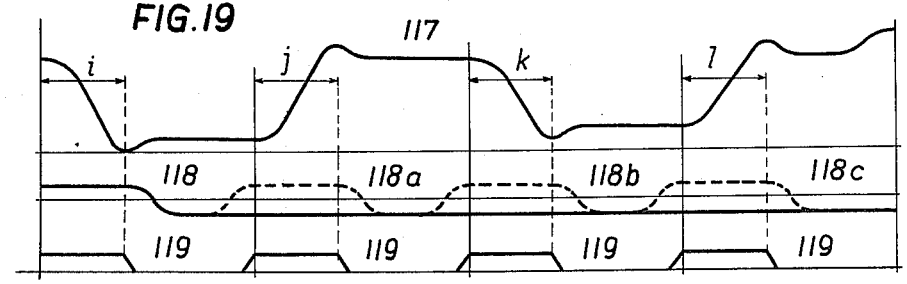
FIGS. 19 to 21 display a further embodiment, FIG. 19 representing the motion diagram of that embodiment, FIG. 20 being a view along the line XX - XX of FIG. 21 and FIG. 21 a section along line XXI - XXI of FIG. 20.

According to FIG. 19 a transport cam 117 is provided, which contains again a transport movement for the super 8 mm format in section $i$, whereas section $j$ provides for the reverse transport movement of that format. Further there is provided a section $k$ with the forward transport movement for conventional 8 mm films and a section $l$ for the reverse transport movement of conventional 8 mm films. The engaging lift 118 may be transferred correspondingly from the position drawn in full lines to one of the positions 118a, 118b, or 118c plotted in broken lines. Each of the respective positions of sections $i$ to $l$ corresponds to a light-innterrupting phase 119, which in this case is effected by a four-bladded shutter.

FIGS. 2o and 2l show an arrangement for the realization of motion paths shown in FIG. 19. Parallel to the plane of a cam member 12o there lies a disk-shaped cam follower carrier 121. This carrier 121 is arranged according to FIG. 21 between a cam member 120 and a claw plate 122, which receives its transport movement by a transport cam 123.

Carrier 121 is in a certain respect similar to the turret disk 72 of FIGS. 4 and 5, it is not, however, twistable, but shows pins 124, which are allowed to siide in cross-shaped guides 125 indicated in dash-dot lines. These cross-shaped guides are elastic, providing on the ends of the cross legs as also in the crossing center latching points for guide pins 124. Thus carrier 121 can be brought to four extreme positions and moreover to a mid-position, which latter it assumes according to the illustration of FIGS. 20 and 21.

Carrier 121 shows, analogously to the turret disk 72 a number of cam followers, i.e. four cam followers 68 to 71, which are again provided with collars 80. Claw plate 122 is shiftable parallel to the direction of driving shaft 126 for transport cam 123 and biased by means of compression springs 127. These compression springs 127 therefore also bias the cam followers, which abut with their collars 80 against carrier 121.

Figure 20:
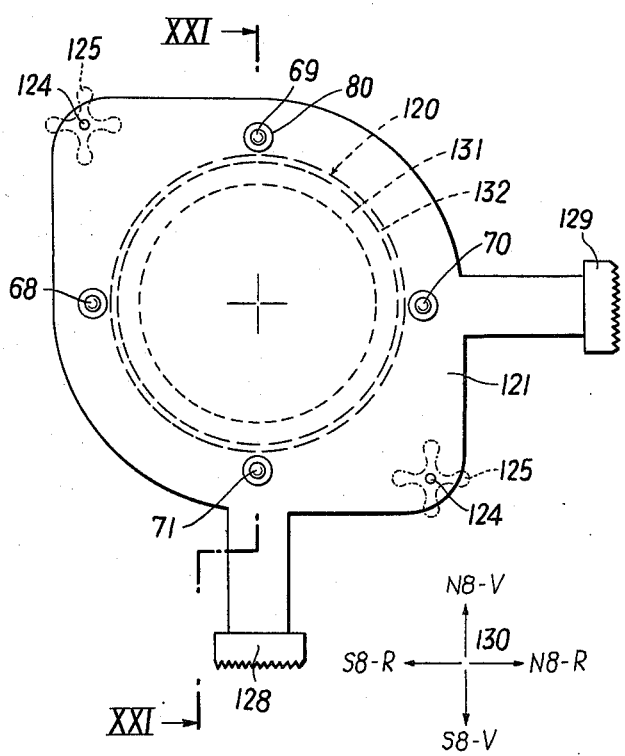

Carrier 121 shows two operating handles 128 and 129, by means of which it is shiftable according to a rosette 130 illustrated in FIG. 20. During this shifting movement carrier 121 is guided by means of guides 125 and guide pins 124. As the cam followers 68 to 71 are phase-shifted by 90° with respect to axis of cam member 120, the engaging lift defined by a cam path 131 provided on cam member 120 is also phase-shifted by 90° in accordance with positions 118, 118a, 118b and 118c in FIG. 19, depending on which of the cam followers is brought to its operative position.

If carrier 120 relating to FIG. 20 is displaced downwards, cam follower 69 abuts first an oblique surface 132 of cam member 120, so that upon further shift of carrier 121 it obstructs cam path 131. The same applies upon a shift of carrier 121 to other directions. The operation of operating handle 128 according to rosette 130 denotes the adjustment to different film formats a forward motion, whereas the operation of operating handle 129 effects the adjustment of different film formats in a reverse motion. To the extent that each of the operating positions is only accessible during the mid-position of carrier 121 in guides 125, a sudden unintended displacement from one mode of operation to another without prior interposition of the rest position is impossible. On the other hand the adjustment of carrier 121 in the mid-position illustrated in the FIGS.

20 and 21 shows that none of the cam followers acts on the claw plate 122, so that this position of carrier 121 corresponds for instance to stationary film projection.

Figure 21:
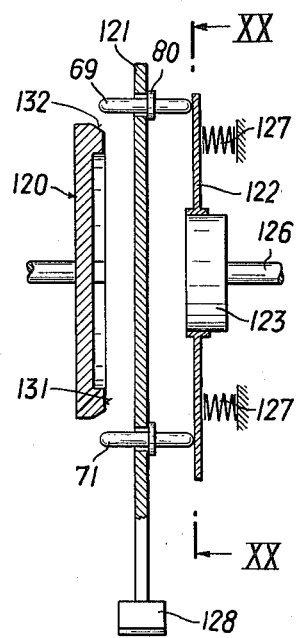

In the embodiments displayed in FIGS. 20 and 21 claw plate 122 is shiftable in a longitudinal direction of shaft 126. Therefore the change of the point of attack of the cam followers 68 and 71 on the claw plate has no effect on the engaging lift. However, in claw devices with a claw rotatable around a non-infinite center of rotation, certain measures are necessary or expedient, in the event that an engaging lift of differing magnitudes should cause problems. A similar problem arises in the embodiment according to FIGS. 4 and 5, in which claw 7 is rotatable about axis 78, the point of attack of the cam followers changing according to the adjusted mode of operation. Properly considered an equally large lift movement of cam follower 71 (FIG. 4) would take less effect on claw 7 than the same movement of claw 68. As may be seen from FIG. 5 the radial outermost curve path 64 must show larger height differences than the radial innermost curve path 67.

Many differing embodiments are conceivable within the scope of the invention. Cam followers 20 and 21 in the embodiments according to FIGS. 4 and 5, could for instance also bear respectively upon an intermediate plate, whose center of rotation in change depending on the adjusted mode of operation, so that an engaging lift of equal magnitude is transmitted to the claw plate. In the various embodiments described sensing of the cams by means of cam followers is achieved by force transmission. It is however also possible to use form-locking cams within the scope of the invention, the change-over to another format being carried out for example by receiving the cam follower first from a cam groove and adjusting accordingly. Cams with change-over slots can also be provided as for example described in German patent DAS 1,244,567. Such a construction is particularly suitable for cinematographic cameras, in which the stop position of the cam or of the main shaft is always clearly defined. Of course a change-over of the mode of operation can then only take place after the apparatus is stopped.

What is claimed is:

1. In a strip handling apparatus for strip-like information carrier, said apparatus having different operating modes,
    an intermittent drive mechanism including cam means rotatable about an axis and having at least two different cam surfaces spaced from each other and corresponding to different operating modes of said apparatus;
    carrier means arranged coaxially to said cam means and being rotatable about said axis relatively to said cam means, said rotatable carrier means having at least two positions corresponding to said different operating modes; and at least two cam followers for engagement with said cam means, said cam followers being arranged in spaced relation on said carrier means, each of said cam followers facing one of said cam surfaces and having an operative and at least one inoperative position in dependence on the positions of said carrier means, only in the operative position the respective cam follower transmitting movement from said cam means for the intermittent drive of said information carrier;

the apparatus further comprising mode control means operatively connected to said carrier means and controling the positions thereof.

2. An apparatus as claimed in claim 1 wherein said rotatable carrier means are formed from resilient material and have at least two springy tongues slit out from said resilient material, said tongues having a free-end portion, said cam followers being fixed to said free end portion.

3. In a strip handling apparatus for strip-like information carrier, said apparatus having different operating modes, an intermittent drive mechanism including cam means rotatable about an axis and having at least two axially spaced different cam surfaces corresponding to different operating modes of said apparatus;

carrier means substantially in form of a hollow cylinder having an outer cylindrical surface and an inner cylindrical surface, said surfaces being opposite to each other, one of said cylindrical surfaces facing said cam surfaces, said carrier means being arranged substantially coaxially to said cam means and rotatable about said axis relatively to said cam means, said rotatable carrier means having at least two positions corresponding to said different operating modes; and at least two cam followers for engagement with said cam means, said cam followers being arranged on one of said cylindrical surfaces of said carrier means in axially and angularly spaced relation with respect to said axis, each of said cam followers facing one of said cam surfaces and having an operative and at least inoperative position in dependence on the positions of said carrier means;

movement transmitting means for transmitting movement from said cam means via the respective cam follower being in operative position, said movement transmitting means lying adjacent the cylindrical surface of said carrier means which is opposite to the cylindrical surface facing cam surfaces;

the apparatus further comprising mode control means operatively connected to said carrier means and controling the positions thereof.

4. An apparatus as claimed in claim 3 wherein said cam surfaces face the inner cylindrical surface of said carrier means whereas said movement transmitting means lie adjacent said outer cylindrical surface.

5. In a strip-handiing apparatus for a strip-like information carrier, said apparatus having different operating modes, an intermittent drive mechanism including cam means rotatable about at least one axis, and having at least two different cam surfaces spaced from each other corresponding to different respective operating modes; carrier means movable relatively to said cam means and having at least two positions corresponding to said different operating modes; and at least two cam followers for engagement with said cam means, said cam followers being arranged in spaced relation on said carrier means and being correlated to at least one of said cam surfaces each of said cam followers having an operative and at least one inoperative position in dependence on said positions of said carrier means, each respective cam follower facing the correlated cam surface at least in said operative position for transmitting motion from said cam means for the intermittent drive of said information carrier; said apparatus further comprising mode control means operatively connected to said carrier means and controlling the positions thereof.

6. An apparatus as defined in claim 5, further comprising pull-down means for said information carrier, said pull-down means being operatively connected to said carrier means, and wherein said cam means includes a plurality of cams arranged axially adjacent to each other; and a cam shaft carrying said cams.

7. An apparatus as defined in claim 6 further comprising spring means connecting said mode control means to said carrier means.

8. An apparatus as defined in claim 6 wherein said carrier means are movable in a normal direction relatively to the generatrices of said cam surfaces.

9. An apparatus as defined in claim 5, for information carriers having at least one row of perforation holes further comprising claw means for feeding said information carrier and being movable in a feeding direction on one hand and in and out of engagement with said perforation holes on the other hand; actuating means for moving said claw means at least in said feeding direction of said information carrier, said cam means periodically preventing at least one movement of said claw means, one position of said carrier means corresponding to the inoperative position of all cam followers so that movement of said claw means in that position is prevented.

10. An apparatus as defined in claim 5 for information carrier having at least one row of perforation holes wherein said carrier means has a stop position, said apparatus further comprising claw means for feeding said information carrier and being movable in a feeding direction on one hand and in and out of engagement with said perforation holes on the other hand, stop means connected to said carrier means and being movable with a movement of the latter along respective first and second paths upon said claw means respectively engaging and disengaging said perforation holes; and couterstop means arranged within said first path for abutment of said stop means when moving said carrier means into said stop position to prevent such movement during engagement of said claw means in said perforation holes.

11. In a strip-handling apparatus for strip-like information carrier, said apparatus having different operating modes, an intermittent drive mechanism including cam means rotatable about an axis and having at least two different cam surfaces spaced from each other and corresponding to different operating modes of said apparatus; carrier means juxtaposed with said cam means and being rotatable about an axis and relative to said cam means, said rotatable carrier means having at least two positions corresponding to said different operating modes; and at least two cam followers for enagagement with said cam means, said cam followers being arranged in spaced relation on said carrier means, each of said cam followers facing one of said cam surfaces and having an operative and at least one inoperative position in dependence on the positions of said carrier means, only in the operative position the respective cam follower transmitting movement from said cam means for the intermittent drive of said informationn carrier; the apparatus further comprising mode control means operatively connected to said carrier means and controlling the positions thereof.

* * * * *